US006169734B1

(12) United States Patent
Wilson

(10) Patent No.: US 6,169,734 B1
(45) Date of Patent: Jan. 2, 2001

(54) INTERNET PHONE SET

(75) Inventor: James E. Wilson, Plano, TX (US)

(73) Assignee: MCI Communications Corporation, Washington, DC (US)

(*) Notice: Under 35 U.S.C. 154(b), the term of this patent shall be extended for 0 days.

(21) Appl. No.: 08/775,505

(22) Filed: Dec. 31, 1996

(51) Int. Cl.$^7$ .................................................. H04M 1/253
(52) U.S. Cl. ........................................ 370/352; 379/93.09
(58) Field of Search ............................ 379/93.01, 93.05, 379/93.06, 93.07, 93.08, 93.09, 93.11, 93.14, 93.17, 93.18, 93.24, 900; 370/477, 460, 352, 353, 354, 355, 356

(56) References Cited

U.S. PATENT DOCUMENTS

| 5,068,888 | 11/1991 | Scherk et al. ..................... 379/100.11 |
| 5,452,289 | * 9/1995 | Shamar et al. ....................... 370/477 |
| 5,541,927 | 7/1996 | Kristol et al. . |
| 5,561,670 | 10/1996 | Hoffert et al. . |
| 5,590,181 | 12/1996 | Hogan et al. .......................... 379/114 |
| 5,646,982 | 7/1997 | Hogan et al. ............................ 379/89 |
| 5,726,984 | * 3/1998 | Kubler et al. .......................... 370/349 |
| 5,805,676 | 9/1998 | Martino .............................. 379/93.17 |
| 5,812,776 | 9/1998 | Gifford .............................. 395/200.47 |
| 5,838,682 | 11/1998 | Dekelbaum et al. ................. 370/401 |

FOREIGN PATENT DOCUMENTS

| 09172459 | 6/1997 | (JP) . |
| 781016 | 6/1997 | (EP) . |
| 9107839 | 5/1991 | (WO) . |
| 9632800 | 10/1996 | (WO) . |
| WO 9812860 | 3/1998 | (WO) . |

OTHER PUBLICATIONS

Jabrun et al.: "Terminals for Accessing the Internet–The Internet Telephone", Alcatel Communications Review No. Apr. 1996, pp. 304–309.

Computer Telephony, CT and the 'Net, Mar. 1996, pp. 219–221.
tele.com, Internet Telephony, Jun. 1996, pp. 68–72.
Newton, The Personal Side of CT, Jan. 1997, pp. 12, 14.
Retkwa, Telephone Politics, Jun. 1996, pp. 54–60.
Kim, Talk is Cheap, Jul. 1996, pp. 34–39.
Platt, Why Iso Ethernet Will Change the Voice and Video Worlds, Apr. 1996, pp. 55–59.
Margulies, CT's Cyberdate With The 'Net, Aug. 1996, pp. 28–29.
Telephony on the Internet Workshop Information.
Bethony, HAHTSite Gives Pros Everything They Need, Mar. 1997, pp. 36–37.
'Net Telephony Spec Recommended, Mar. 1997, pp. 12–13.
Civanlar et al., FusionNet: Joining the Internet & Phone Networks for Multimedia Applications, 1996, pp. 431–432.

(List continued on next page.)

Primary Examiner—Huy D. Vu

(57) ABSTRACT

An Internet phone provides standard voice and Internet audio functions using the familiar Plain Old Telephone System platform. Internet audio connections are initiated using an access button on the base of the telephone. A phone keypad and alphanumeric keyboard provide both DTMF dialing and Internet message handling functions. A speaker is provides or the hand set can be used to send and receive Internet compressed audio messages over the Public Switched Telephone System via the user's Internet access provider. The user selects a recipient from a stored address list or creates a new recipient using the alphanumeric keyboard. Once the call is established, a user at either end speaks directly into the phone receiver wherein his voice signal is digitized into a voice file that is stored and transferred to the user at the other end. The Internet phone an integrated display and display electronics which decode incoming messages. A ROM based program inside the phone decodes the address portion of an incoming Internet message and displays it on the screen identifying the identity of the the caller.

13 Claims, 3 Drawing Sheets

OTHER PUBLICATIONS

Serrano, Evolution of a Hybrid Fibre Coaxial Network for Multimedia Interactive Services, Oct. 1996, pp. 249–253.
Hurwicz, Faster, Smarter Nets, Apr. 1997, pp. 83–89.
Internet By Satellite.
Low, WebIN–An Architecture for Fast Deployment of IN–based Personal Services, Apr. 1996, vol. 1.
The Intelligent Web, Apr. 1996, vol. 2.
Grami, et al., The Role Of Satellites In The Information Superhighway, Jun. 1995, pp. 1577–1581.
Chen et al., ATM and Satellite Distribution of Multimedia Educational Courseware, Jun. 1996, pp. 1133–1137.
Sunaga et al., A Reliable Communication Switching Platform for Quick Service Provisioning, Feb. 1995, pp. 77–82.
Tsuchida et al., Intelligent Dynamic Service Provisioning Architecture in the Multimedia Era, Apr. 1996, pp. 1117–1122.
Schreyer et al., Least Cost Call Routing, Apr. 1996, pp. 12–.
Jain, Evolving Existing Narrowband Networks Towards Broadband Networks with IN Capabilities, Apr. 1996.
Gupta et al., Technical Assessment of (T)INA–TMN–OSI Technology For Service Management Applications, Feb. 1994, pp. 877–887.
Ejiri, For Whom The Advancing Service/Network Management, Feb. 1994, pp. 422–433.
Ely, The Service Control Point as a Cross Network Integrator, Apr. 1996, pp. 1–8.
Perret et al., MAP: Mobile Assistant Programming for Large Scale Communications Networks, Apr. 1996, pp. 1128–1132.
Cobbold et al, Enhancements for Integrated Wireless Personal Communications over Metropolitan Area Networks, Apr. 1996, pp. 1370–1376.
Sclavos et al., Information Model: From Abstraction to Application, Feb. 1994, pp. 183–195.
Aidarous et al., The Role Of The Element Management Layer In Network Management, Feb. 1994, pp. 59–69.
Inamori et al., Applying TMN to a Distributed Communications Node System with Common Platform Software, Feb. 1995, pp. 83–87.
Kolarov et al., End–to–end Adaptive Rate Based Congestion Control Scheme for ABR Service in Wide Area ATM Networks, Feb. 1995, pp. 138–143.
Duan et al., Efficient Utilization of Multiple channels between two Switches in ATM Networks, Feb. 1995, pp. 1906–1911.
Kishimoto, Agent communication system for multimedia communication services, Mar. 1996, pp. 10–17.
Elia et al., Skyplex: Distributed Up–link for Digital Television via Satellite, Dec. 1996, pp. 305–313.
Kelly, Mountaintop office keeps skiers in touch, USA Today, vol. 15 No. 112.
Macedonia et al., Mbone Provides Audi and Video Across the Internet, Apr. 1994.
Kumar, Internet Multicasting: Internet's Next Big Thing, Jan. 1996.
Schulzrinne et al., RFC 1889–RPT: A Transport Protocol For Real–Time Applications, Jan. 1996.
Schulzrinne et al., RFC 1890–RPT Profile for Audio and Visual Conferences With Minimal Control, Jan. 1996.
Eriksson, Mbone: The Multicast Backbone, Aug. 1994.
Sullivan, Videoconferencing Arrives on the Internet, Aug. 1996.
Kahn, Videoconferencing Debuts on the Internet, Feb. 1995.

* cited by examiner

INTERNET PHONE SET

TECHNICAL FIELD

The invention relates in general to a device for receiving and transmitting audio signals via the Public Switched Telephone Network and, more particularly, to a telephone hand set with combined voice and Internet compressed audio signal telecommunications functions.

BACKGROUND OF THE INVENTION

The Internet has become the information "superhighway" of choice for an ever increasing number of individuals who have turned to it as an inexpensive and effective way of exchanging electronic data and information. While often thought of as a world-wide network, in reality the Internet is comprised of numerous different networks throughout the world which are linked together using a common routing protocol known as the Internet Protocol (IP). This architecture provides widespread access from an unspecified number of terminals or other dial-up equipment around the world.

Individual users, groups and other entities are identified on the Internet by a unique address conforming to the IP. A local access hub provides users with an entry way into the Internet network and acts as the exchange point for both incoming and outgoing data. The data flows along virtual channels consisting of a plurality of gateways, data routers and other physical equipment which work together to form a signal path from message origin to its intended destination. Since a point-to-point connection is never established, the costs to the user are limited to those charged by the local access provider and/or a nominal periodic access fee.

The low cost associated with Internet access and use has spurred the development of audio applications that allow users to receive and transmit compressed Internet voice messages across the Internet. Typically, a user at one end of the connection speaks into a microphone attached to a Personal Computer ("PC"). The microphone carries the audio voice signal to a processor board in the PC which digitizes the signal and creates a digital voice file. The voice file is then typically compressed and transferred to a selected recipient at a distant point on the Internet. Once received, the voice file is decompressed and converted via digital signal processing to an audible signal intelligible to the human ear.

The typical Internet audio set includes a PC, modem, Internet access software, file compression software and operating system. The user executes the software off the PC's hard disk or floppy drive and the modem provides the hardware communications link with the local Internet access provider. This operation involves turning the PC ON, executing the software, gaining access to the Internet, recording the voice file and transmitting its intended recipient. At the receiving end, the process is duplicated in almost exact fashion but in reverse.

While such applications are available and useful for inexpensive long distance use, the average long distance caller may not have access to a computer or may not be versed in the installation, operation and use of computer executed software. These prior art audio sets have not yet replaced the Plain Old Telephone System ("POTS") on a widespread basis. The POTS, on the other hand, has widespread appeal and provides intuitive operation.

Thus, a device that combines the simplicity of operation of the POTS with low cost audio access to the Internet would provide numerous advantages over prior Internet audio sets.

SUMMARY OF THE INVENTION

It has been found the prior audio communications systems for the Internet are cumbersome to use and do not provide the functionality long distance callers have come to expect from their familiar telephone set.

As such, it is a primary object of the present invention to provide a device that integrates the functionality of the POTS with dial-up access to the Internet. In this regard, a device which supports Internet audio protocol standards G.723, G.725 and G.729 and standard analog audio protocol G.711 for all phones is provided.

In one embodiment, the present invention defines an Internet compatible phone with an integrated modem set that is operated by the user via an extended keypad with alphanumeric entry keys and function keys. An Internet dial button on the front face of the phone operates the modem functions inside the telephone providing a switch between normal DTMF voice communications and Internet compressed voice signal functions using available Internet service providers. The phone has an integrated display screen and display electronics that renders visual call progress information to the user as well as other communications indicators and related information about the current Internet connection.

Another object of the present invention is to provide a device that is similar to the POTS. In this regard, a true telephone phone set, one that doesn't require to be booted up to run a standard PC, is provided with a phone keypad for DTMF dialing similar to a regular phone. The set includes a hand set with a receiver and mouth piece and can be used to make voice connections via the PSTN and compressed audio using the Internet protocol.

All Internet access functions are transparent to the user while in normal voice mode operation. An Internet access button is depressed by the user to activate access to the Internet using a preprogrammed access number and other access parameters stored in an erasable memory circuit. The user selects a recipient from a stored address list or creates a new recipient using the alphanumeric keyboard. Once the call is established, a user at either end speaks directly into a microphone on the base of the device wherein his voice signal is digitized into a voice file that is stored, compressed and routed to the user at the other end.

Yet another object of the present invention is to provide a visual interface to the information content of an audio message transferred over the Internet. To achieve this, a display screen display driver are provided inside the base of the phone. A digital signal processor inside the phone decodes the incoming message and strips the address portion of the message. The address is displayed at the phone screen display identifying the identity of the the caller.

For a more complete understanding of the present invention, including its features and advantages, reference is now made to the following detailed description, taken in conjunction with the accompanying drawings.

BRIEF DESCRIPTION OF THE DRAWINGS

In the drawings.

Corresponding numerals refer to corresponding parts in the figures unless otherwise indicated.

DETAILED DESCRIPTION OF THE INVENTION

Figure 1:
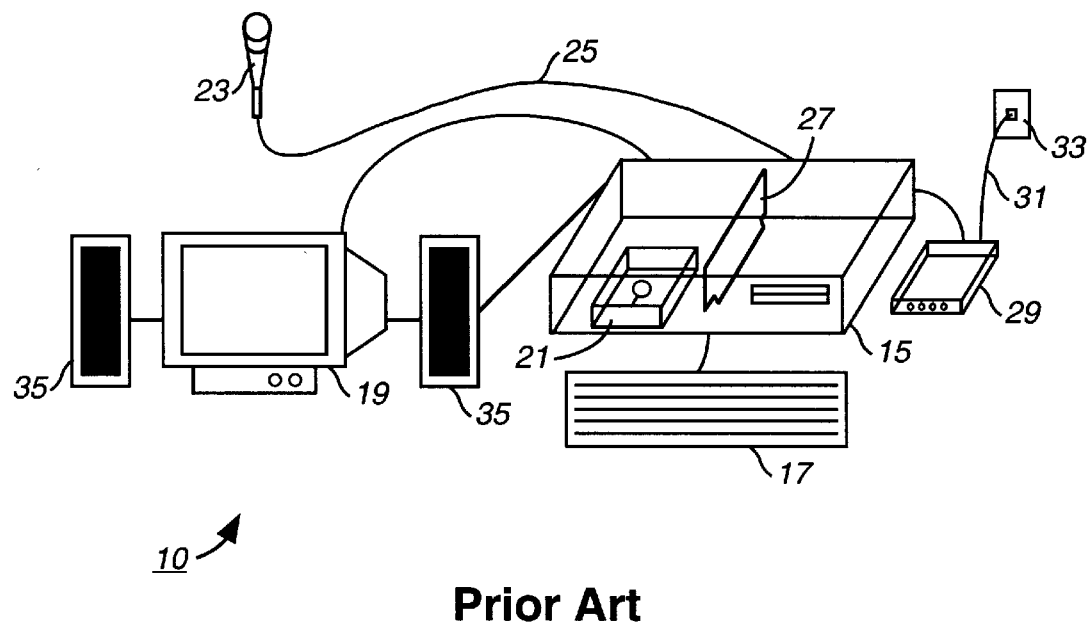
FIG. 1 illustrates a prior art Internet audio set.

In FIG. 1, a prior art Internet audio set is shown and denoted generally as 10. Internet set 10 includes a personal computer (PC) 15 with a keyboard 17 and monitor 19. Inside the PC 15 are a plurality of application programs which are stored generally on hard disk 21. A microphone 23 is communicably attached to the PC 15 via cable 25 which carries audio signals from the user to a processing board 27. The processing board 27 digitizes the voice signal and creates a voice file which can be stored on hard disk 21 prior to transmission.

In operation, a user gains access to the Internet via an application program stored on hard disk 21. The manner and steps involved in such a process vary depending on the type of PC 15 and software program used. A plurality of Internet access providers may be used for this purpose wherein the user subscribes to the provider and uses a modem 29 to establish the communications link between the user and the provider. In general, the user executes a voice recording program stored on hard disk 21. The voice recording program accepts an audio signal input via the microphone 23 and operates the processing board 27. Other PC 15 functions can be operated using keyboard 17.

The processing board 27 receives the audio analog signal from the user via the microphone 23 and cable 25 and creates a corresponding digital file using on-board digital signal processing. The techniques and methods of digital signal processing are well known in the industry and by those skilled in the art.

Next, the user selects an intended recipient from the application program interface and the digital audio file is sent to the chosen recipient via the modem 29. As shown, the modem 29 is communicably attached via cable 31 to the Public Switched Telephone Network ("PSTN") 33. Call and transmission progress information are displayed on monitor 19 depending on the status of the connection. For example, the monitor 19 can display the recipient, connection status and latest activity. Other information can be displayed depending on the software program used and the functionality of the Internet audio set 10.

The audio set 10 can also be used to receive audio files using the PSTN 33 connection and modem 29. In general, a transmitting party at a distant location uses the address of the audio set 10 to transmit digitized audio messages over the Internet in the manner described above. The audio set 10, and more specifically processing board 27, receives the incoming audio signal and transforms it to its corresponding analog equivalent. The analog audio signal is broadcast over the PC speaker 35 which is controlled by the audio application software.

Thus, the prior art audio set 10 provides a mechanism for voice communications over the Internet using the above described process and hardware shown in FIG. 1. Variations of set 10 are also available using similar methods of operation and allowing users a plurality of similar functionality. Such systems, however, are substantially similar in that they depend on use of a PC 15, application programs, and other similar equipment as shown in FIG. 1.

Figure 2:
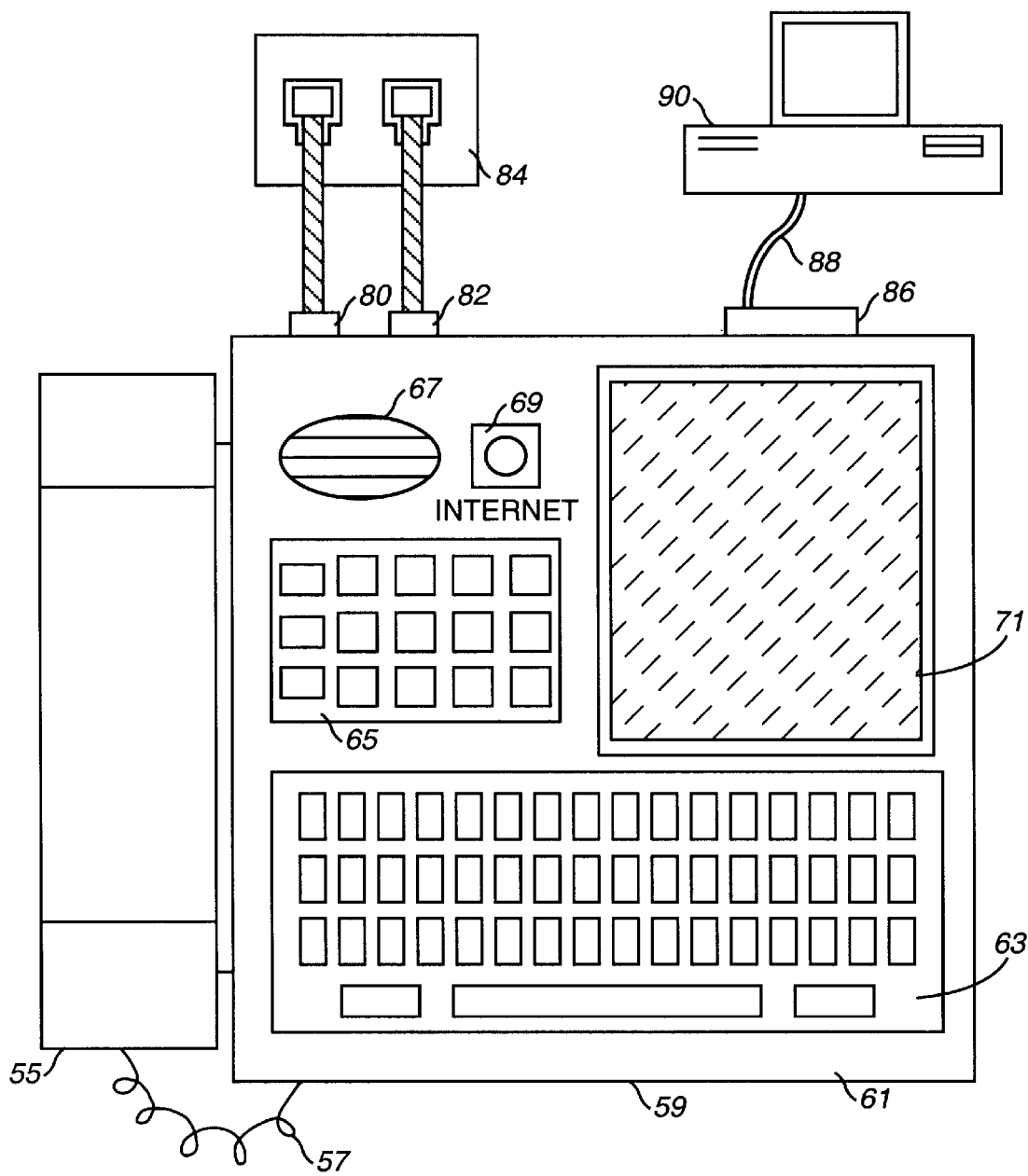
FIG. 2 is a top side view of the Internet phone according to the present invention.

Turning now to FIG. 2, the Internet phone 50 of the present invention is shown. Internet phone 50 has many of the features of a Plain Old Telephone System ("POTS") including hand set 55 which has an ear piece 58 and a mouth piece 56 for hearing and speaking, respectively. The hand set 55 can be used to transmit and receive the pure analog audio signals, which are digitized and processed for transmission on the network.

As shown, the hand set 55 is communicably attached via cable 57 to base 59. The base 59 houses the various telecommunications devices as herein described and as can be appreciated by those skilled in the art.

Accessible from on the top 61 of base 59 are various keys and input devices which control the operation and functionality of the Internet phone 50. An alphanumeric keyboard 63 provides a QWERTY type interface from which the user can enter alphabetic and numeric entries and messages to be included in the Internet message stream. The keyboard 63 is similar to the input device of a typical desktop computer.

In one embodiment, a numeric keypad 65 is shown and provided to give the identical Dual Tone Multifrequency ("DTMF") push button operation of a POTS. Thus, in operation a user lifts the hand set 55 and dials into the PSTN using keypad 65 to make normal voice DTMF telephone calls. In this way, POTS functionality is provided by the Internet phone 50 according to one embodiment.

A microphone 67 is provided on the base 59 and used to receive and transmit audible signals from and to the user. The microphone 67 is controlled by internal electronics inside the base 59 (see FIG. 3) and provides audible incoming and outgoing audio signals. In the alternative, audio signals can be received and transmitted via the hand set 55 using the ear piece (not shown) and mouth piece (not shown), respectively.

According to one embodiment, an Internet access button 69 is provided on the base 59 and used to switch between normal DTMF voice calls and Internet dial-up operations. In this way, access button 69 can be used to initiate an Internet connection using the internal modem set (not shown in FIG. 2) without interrupting the present DTMF initiated switched voice connection.

An integrated display screen 71 is provided to give the user visual information about the current Internet connection as well as other connection/status information. For example, the display screen 71 can show the current callee, a stored list of available callees including their Internet addresses, the identity of the transmitting party and his Internet address, a list of the most currently received or transmitted messages or other similar information according to the preprogrammed functionality of the Internet phone 50.

As such, it should be understood that a wide range of information may be displayed on the display screen 71. In the preferred embodiment, display screen 71 is a liquid crystal display of the type commonly found in industry.

The Internet phone 50 connects to the PSTN via jacks 80 and 82 which provide dual line access to the PSTN via outlets 84. This configuration provides concurrent DTMF and Internet connections. In an alternative embodiment, single line access is provided wherein the Internet phone 50 is used as either a DTMF voice or Internet audio set per single session. In one embodiment, the connection mode is selected by the user with button 69.

A connection 88 to a computer 90 is also provided to permit the transfer of Internet formatted messages between the Internet phone 50 and the computer 90. An RS232 jack 86 is the preferred interface between the Internet phone 50 and the computer 90 for serial data transfers although other connection protocols, such as parallel bus, may be used.

Figure 3:
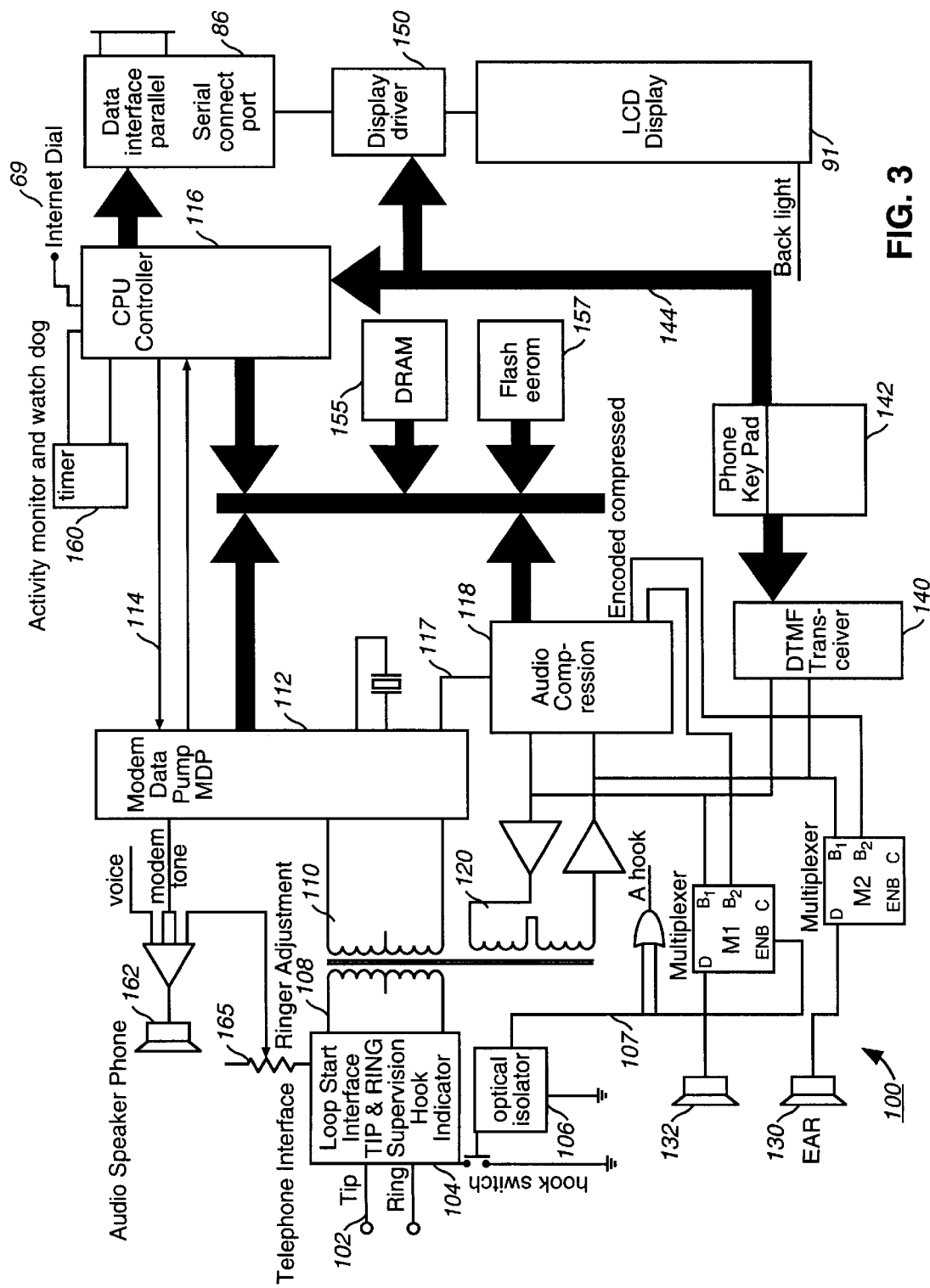
FIG. 3 is a detailed circuit diagram for the Internet phone according to the invention.

In FIG. 3, a circuit diagram for the Internet phone 50 is shown and denoted generally as 100. Circuit diagram 100 is one possible arrangement of components. Those skilled in the art will appreciate that other configurations may be employed. The components are maintained inside the base 59 and assembled during manufacturing by well known means such as on a printed circuit board. Standard off-the-shelf components which are readily available in the market place may be used for most devices and, as such, no particular or specific device is necessary to achieve the objects of the invention as herein described.

As shown, a telephone line interface 102 serves as a connection between the PSTN and the Internet phone 50. A supervisory circuit 104 provides the Onhook/Offhook mechanism between the interface 102 and the PSTN and is operated by the optical isolator 106. The analog signal is received superimposed on a DC level carrier which is isolated via the transformer primary 108.

The analog signal is dropped across the secondary portion 110 of the line transformer where it is load balanced and received by the modem data pump 112. In essence, the telephone line interface 102, isolator circuit 106, and transformer 108, 110 form a direct access arrangement of the type well known by those skilled in the art. It should be understood, however, that other similar configurations and methods of interfacing the modem data pump 112 to the PSTN can be used.

The modem data pump 112 is controlled by CPU controller 116 via path 114. In various embodiments, the data pump 112 supports a plurality of data transmission, compression and error correction protocols including, without limitation, V.34, V.32, V.22, V.42 LAPM, MNP2–5 and still others. Such protocols are well known by those skilled in the art.

An audio compression circuit 118 is also shown coupled to the data pump 114 via path 117 which supports known Internet audio standard protocols such as G.723, G.725 and G.729. The compression circuit 118 also supports G.711 which is the standard audio protocol for all POTS. As shown, circuit 118 is coupled to the primary 108 via coil 120 allowing bidirectional audio transmission through and from the PSTN.

A speaker 130 and microphone 132 are provided to provide the user with an audible signal output and voice input, respectively. During an Internet audio session, the optical isolator circuit 106 enables the microphone 132 portion of the circuit 100 via path 107. Signals from the microphone 132 are received by the compression circuit 118 and transferred to the data pump 112 for signal processing and transmission on the PSTN to its intended recipient using well known modulation/demodulation techniques.

Likewise, signals received from the PSTN via the data pump 112 are deencoded by the compression circuit 118 and delivered to the user via the speaker 130 as an audible output signal. The corresponding multiplexing logic (M1 and M2) are shown arranged in FIG. 3 per one embodiment.

DTMF functionality is supported via transceiver circuit 140 and phone keypad 142. This arrangement gives the Internet phone 50 DTMF dial-up capabilities for normal voice connections on a switched circuit basis and alphanumeric entry during Internet sessions. The phone keypad 142 combines the inputs from the keyboard 63 and keypad 65 shown in FIG. 2 and is coupled to the controller 116 via pathway 144. The controller 116 is programmed to select the correct input device depending on the type of connection, either standard DTMF or Internet Protocol.

The preferred display screen 71 is a Liquid Crystal Display of the type known to those skilled in the art and is controlled by display driver circuit 150 and controller 116 via path 144. Other system components include memory circuits 155 and 157, which, provide the microprocessor with permanent and erasable memory area segments for performing the various functions herein described. Such functions include power-up sequences, system checks and other standard system verification processes as well as call connect functions, user features and still others.

One feature of the Internet phone is the ability to connect to existing Internet access provider services without requiring extensive software knowledge by the user. In one embodiment, access parameters are maintained on the erasable and programmable memory circuit 157. The access parameters control how the phone 50 connects to the user's Internet access provider.

In one embodiment, the user is prompted to enter a plurality of access parameters such as the provider's telephone number, IP address, domain name server address, user name, password and other similar parameters during initial setup. The Internet access setup program is stored internally by the controller circuit 116 and input by the user is accomplished using the phone keypad 142. These parameters are stored in memory circuit 157 and used for connection to the provider once the Internet access button 69 is depressed.

The controller 116, as shown, initiates the connection using the parameters stored in the memory circuit 157. In this regard, a setup program can be internally maintained and executed upon initial use or setup by the user.

Also, the erasable memory circuit 157 can be used to store a list of common recipients by their Internet addresses. Alternatively, the user creates new recipients for further use and retrieval using the alphanumeric keyboard 63 of the phone keypad 142.

Other system components are illustrated in FIG. 3 such as watch dog timer circuit 160, audio speaker phone 162 and ringer adjustment circuit 165 all of which are well understood by those skilled in the art.

In summary, the present invention comprises a device that combines DTMF voice functions with an Internet audio set into an integrated POTS platform which is familiar to everyday telephone users. The outward appearance of the device is illustrated in FIG. 2 while the internal arrangement of device components appears in the circuit diagram of FIG. 3.

While this invention has been described and referenced to illustrative embodiments, the description is not intended to be construed in a limiting sense. Various modifications and combinations of illustrative embodiments as well as other embodiments and inventions will become apparent to those persons skilled in the art upon reference or description. It is, therefore, intended that the pendent claims encompass any such modifications or embodiments.

What is claimed is:

1. A circuit for receiving and transmitting both standard phone audio and Internet compressed voice signals over the Public Switched Telephone Network ("PSTN") comprising:
    a telephone line interface to the PSTN;
    a modem data pump coupled to said telephone line interface via a first isolation transformer coil;
    an audio compression circuit coupled to said telephone line interface via a second isolation transformer coil and communicably linked to said modem data pump;
    an optical isolator circuit for switching between said audio compression circuit and said modem data pump, said isolator circuit interspersed between said telephone line interface and said audio compression circuit; and
    a controller circuit communicably linked to said modem data pump.

2. The circuit according to claim 1 further comprising:
    a Dual Tone Multifrequency ("DTMF") transceiver circuit coupled to said audio compression circuit on the side of said second isolation transformer coil; and
    a DTMF dialer keypad coupled to said DTMF transceiver circuit.

3. The circuit according to claim 2 further comprising a multiplexor interspersed between said isolation circuit and said voice compression circuit for controlling the switching functions between DTMF and Internet voice transmissions.

4. The circuit according to claim 1 wherein said audio compression circuit supports G.723, G.725, G.729 and G.711 audio protocols.

5. The circuit according to claim 1 further comprising:

a display driver circuit coupled to said controller circuit; and a display screen coupled to said display driver circuit.

6. The circuit according to claim 5 wherein said display screen is a liquid crystal display.

7. The circuit according to claim 2 further comprising:

a permanent memory area storing a plurality of telecommunications program segments including at least one Internet access service setup program, said permanent memory area coupled to said controller circuit; and an erasable memory area for storing a plurality of configurably written Internet access parameters, said erasable memory area couple to said controller circuit.

8. The circuit according to claim 2 further comprising a data port jack supporting standard protocol communications with a personal computer, said data port jack communicably linked to said controller circuit.

9. The circuit according to claim 2 further comprising an Internet access switch coupled to said controller circuit.

10. The circuit according to claim 1 wherein said modem data pump includes signal processing support for a plurality of signal transmission, compression and correction protocols.

11. The circuit according to claim 10 wherein said modem date pump is programmable.

12. The circuit according to claim 1 further comprising an activity monitor and watch dog circuit coupled to said controller circuit.

13. The circuit according to claim 1 further comprising:

an audio speaker phone coupled to said modem data pump; and a ringer adjust circuit coupled to said audio speaker phone for adjusting the volume of the speaker output signal.

* * * * *